(12) United States Patent
Ravirajh et al.

(10) Patent No.: US 12,170,691 B2
(45) Date of Patent: Dec. 17, 2024

(54) MECHANISM FOR PROTECTING FRONT-HAUL LINK FROM MAN-IN-THE-MIDDLE (MITM) ATTACK

(71) Applicant: Rakuten Symphony, Inc., Tokyo (JP)

(72) Inventors: Raghul Ravirajh, Bangalore (IN); Nagendra Bykampadi, Bangalore (IN); Satish Balagopalan, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/918,836

(22) PCT Filed: Jul. 11, 2022

(86) PCT No.: PCT/US2022/036648
§ 371 (c)(1),
(2) Date: Oct. 13, 2022

(87) PCT Pub. No.: WO2023/191836
PCT Pub. Date: Oct. 5, 2023

(65) Prior Publication Data
US 2024/0223605 A1    Jul. 4, 2024

(30) Foreign Application Priority Data
Mar. 31, 2022 (IN) .............................. 202241019649

(51) Int. Cl.
*H04L 9/40* (2022.01)
*H04W 12/12* (2021.01)

(52) U.S. Cl.
CPC ......... *H04L 63/1475* (2013.01); *H04W 12/12* (2013.01)

(58) Field of Classification Search
CPC ........................... H04L 63/1475; H04W 12/12
See application file for complete search history.

(56) References Cited

U.S. PATENT DOCUMENTS

| 6,041,348 A * | 3/2000 | Smith ................. | G06F 13/4265 709/227 |
| 7,860,006 B1 * | 12/2010 | Kashyap ............. | H04L 63/0227 702/182 |

(Continued)

FOREIGN PATENT DOCUMENTS

WO    WO-2017100394 A1 *    6/2017    ......... H04L 12/4633

OTHER PUBLICATIONS

International Search Report dated Nov. 2, 2022 issued by the International Searching Authority in Application No. PCT/US2022/036648.

(Continued)

*Primary Examiner* — Matthew Smithers
(74) *Attorney, Agent, or Firm* — Sughrue Mion, PLLC (57) ABSTRACT

A method, performed by at least one processor, for protecting a front-haul link from a Man-in-the-Middle (MiTM) attack in a network communication system includes receiving, through a port of an authenticator, an authentication request for port authentication from a supplicant via an Ethernet Frame, obtaining, by the authenticator from the Ethernet frame, a hop count corresponding to a number of hops in a transmission path of the Ethernet frame between the supplicant and the authenticator, comparing the hop count to a predetermined threshold to determine whether the port should be disabled, and disabling the port based on the hop count being greater than the predetermined threshold.

20 Claims, 6 Drawing Sheets

(56) References Cited

U.S. PATENT DOCUMENTS

2019/0044974 A1* 2/2019 Hayward ................ H04L 12/28
2023/0208818 A1* 6/2023 Cavaliere ................ H04L 63/18
                                                    726/26

OTHER PUBLICATIONS

Written Opinion dated Nov. 2, 2022 issued by the International Searching Authority in Application No. PCT/US2022/036648.

* cited by examiner

FIG. 1

(Related Art)

FIG. 2

(Related Art)

FIG. 3

(Related Art)

MECHANISM FOR PROTECTING FRONT-HAUL LINK FROM MAN-IN-THE-MIDDLE (MITM) ATTACK

CROSS-REFERENCE TO RELATED APPLICATIONS(S)

This application is a National Stage of International Application No. PCT/US2022/036648, filed Jul. 11, 2022, and is based on and claims priority to Indian Provisional Application No. 202241019649, filed on Mar. 31, 2022, the disclosures of which are incorporated by reference herein in their entireties.

1. FIELD

Apparatuses and methods consistent with example embodiments of the present disclosure relate to wireless communication, specifically a mechanism for protecting a front-haul link from a Man-in-the-Middle (MiTM) attack.

2. DESCRIPTION OF RELATED ART

In the related art, a man in the middle (MiTM) attack is a general term for an offender in a middle of a communication session between a user (e.g., supplicant) and an application (e.g., authenticator). The offender may attack the interaction by eavesdropping or impersonating one of the parties, making the communication session between the offender and the application appear as a normal information exchange. The goal of an attack, as an example, may be to steal personal information such as login credentials, account information, and credit card numbers. The offender may target supplicants of financial applications, business websites, e-commerce websites, and other websites that require logging in. The offender may use the information obtained during the attack to commit identity theft, unauthorized fund transfers, and unauthorized password changes, etc.

Prior to communication, the supplicant (10) must complete a port authentication with the authenticator (30) (e.g., using 802.1x Port Authentication, etc.) based on information in an authentication server (40). However, as part of an authentication process, a rogue bridge/entity (20) may intervene between the supplicant (10) and the authenticator (3), i.e., as a middleman MiTM (60) between the supplicant (10) and the authenticator (30). The rogue entity (20) waits for the port to be authenticated, then initiates an attack (e.g., MiTM attack).

Figure 1:
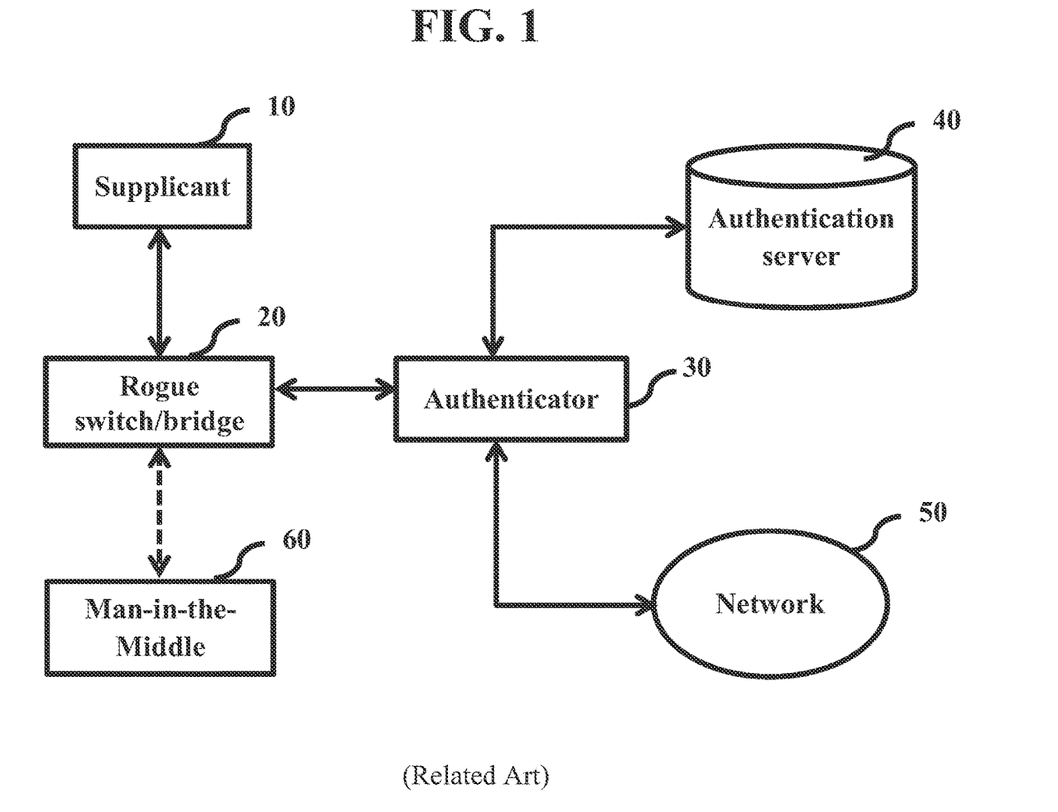
FIG. 1 illustrates a MiTM attack using a rogue switch/bridge, according to the related art.

The rogue entity (20) may be a rogue switch, a rogue bridge, etc., as illustrated in FIG. 1. Specifically, the rogue entity (20) is connected to a port in the authenticator (30) for transmitting data. However, the port needs to be open before any data is transmitted. That is, the port authentication must be deemed successful in order to open the port and begin transmitting data. The supplicant (10) connects to the rogue entity (20) with the assumption that the rogue entity (20) is the authenticator (30) (e.g., a switch with authentication capability) and initiates 802.1x authentication with the rogue entity (20). For example, the supplicant (10) sends an authentication request to the rogue switch instead of sending the request to the authenticator (30). Next, the rogue entity (20) forwards the packets (e.g., authentication request) to an actual authenticator (30) during authentication. Once the authentication is successful, the port will be opened in the authenticator (30). As a result, the MiTM (60) may send/receive packets to/from a network (50) (e.g., cellular network, cloud network, wireless network, etc.) via the port using the rogue entity (20). Hence, the MiTM attack is initiated since the port is open.

Figure 2:
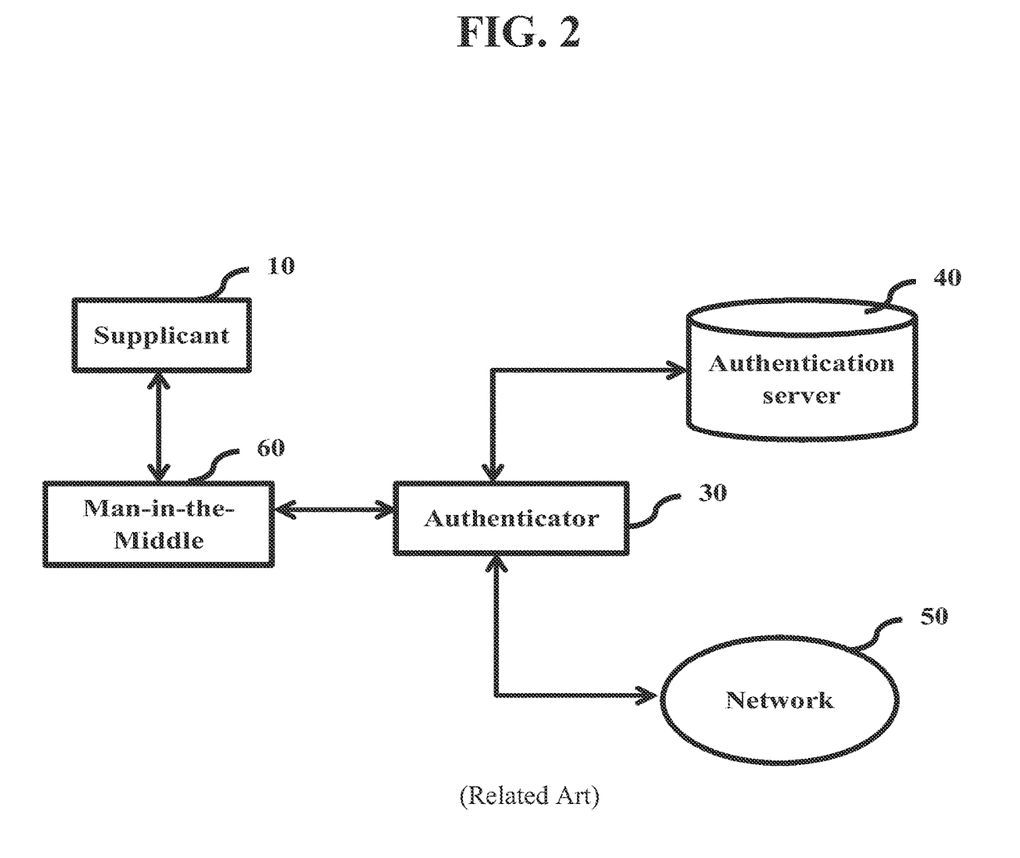
FIG. 2 illustrates the MiTM Attack without using the rogue switch/bridge, according to the related art.

Alternatively, the MiTM attack may be carried out, for example, by a person via a terminal device (e.g., phone, computer, etc.) as the MiTM (60), as shown in FIG. 2. The attacker's terminal device acts as the rogue entity itself and connects to the port of the authenticator (30) without a rogue switch/bridge. The terminal device will forward the packets to/from the authenticator (30). Once the authentication is successful, the port in the authenticator (30) switch opens and may be used by the MiTM (60) (i.e., terminal device) to initiate the attack and spoof packets to/from the network (40).

Thus, it is desired to address the above-mentioned disadvantages or other shortcomings or at least provide a useful alternative for a front-haul link from the MiTM attack.

SUMMARY

According to embodiments, systems and methods are provided protecting a front-haul link from a Man-in-the-Middle (MiTM) attack.

According to embodiments, a method, performed by at least one processor, for protecting a front-haul link from a Man-in-the-Middle (MiTM) attack, in a network communication system, the method including: receiving, through a port of an authenticator, an authentication request for port authentication from a supplicant via an Ethernet Frame; obtaining, by the authenticator from the Ethernet frame, a hop count corresponding to a number of hops in a transmission path of the Ethernet frame between the supplicant and the authenticator; comparing the hop count to a predetermined threshold to determine whether the port should be disabled; and disabling the port based on the hop count being greater than the predetermined threshold.

The predetermined threshold is configured in the port of the authenticator, the port being an L2 interface.

The hop count is obtained from a header of the Ethernet frame.

The header of the Ethernet frame comprises a 6 byte preamble and a 1 byte hop count field in which the hop count is recorded.

The hop count field is between the preamble and a Start Frame Delimiter (SFD) field.

The hop count is incremented in the Ethernet frame by any device included in the transmission path.

The port authentication is an IEEE 802.1x port authentication.

According to embodiments, an apparatus for protecting a front-haul link from a Man-in-the-Middle (MiTM) attack, in a network communication system, the apparatus including: a memory storing instructions; and at least one processor configured to execute the instructions to: receive, through a port of an authenticator, an authentication request for port authentication from a supplicant via an Ethernet Frame; obtain, by the authenticator from the Ethernet frame, a hop count corresponding to a number of hops in a transmission path of the Ethernet frame between the supplicant and the authenticator; compare the hop count to a predetermined threshold to determine whether the port should be disabled; and disable the port based on the hop count being greater than the predetermined threshold.

The predetermined threshold is configured in the port of the authenticator, the port being an L2 interface.

The hop count is obtained from a header of the Ethernet frame.

The header of the Ethernet frame comprises a 6 byte preamble and a 1 byte hop count field in which the hop count is recorded.

The hop count field is between the preamble and a Start Frame Delimiter (SFD) field.

The hop count is incremented in the Ethernet frame by any device included in the transmission path.

The port authentication is an IEEE 802.1x port authentication.

According to embodiments, a non-transitory computer-readable recording medium having record thereon instructions executable by at least one processor to perform a method for protecting a front-haul link from a Man-in-the-Middle (MiTM) attack, in a network communication system, the method including: receiving, through a port of an authenticator, an authentication request for port authentication from a supplicant via an Ethernet Frame; obtaining, by the authenticator from the Ethernet frame, a hop count corresponding to a number of hops in a transmission path of the Ethernet frame between the supplicant and the authenticator; comparing the hop count to a predetermined threshold to determine whether the port should be disabled; and disabling the port based on the hop count being greater than the predetermined threshold.

The predetermined threshold is configured in the port of the authenticator, the port being an L2 interface.

The hop count is obtained from a header of the Ethernet frame.

The header of the Ethernet frame comprises a 6 byte preamble and a 1 byte hop count field in which the hop count is recorded, and wherein the hop count field is between the preamble and a Start Frame Delimiter (SFD) field.

The hop count is incremented in the Ethernet frame by any device included in the transmission path.

The port authentication is an IEEE 802.1x port authentication.

Accordingly, embodiments herein disclose a mechanism for protecting a front-haul link from a Man-in-the-Middle (MiTM) attack by detecting a rogue entity in the MiTM attack in an Ethernet layer in a scenario of authentication (e.g., 802.1x port authentication). The MiTM is where the rogue entity connects in between a supplicant and an authenticator with/without using the rogue entity (e.g., Rogue Bridge).

In an embodiment, the method includes detecting the rogue entity once the rogue entity is in place (e.g., once the rogue entity is communicated with the authenticator for initiating authentication process) and once detected, and disabling the port as a precautionary measure.

In an embodiment, the method includes preventing the MiTM attack by using a hop count in the Ethernet layer during authentication (e.g., 802.1x port authentication).

Additional aspects will be set forth in part in the description that follows and, in part, will be apparent from the description, or may be realized by practice of the presented embodiments of the disclosure.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

Example embodiments of the present disclosure provide a method and a system for protecting a front-haul link from a Man-in-the-Middle (MiTM) attack using a rogue entity in an Ethernet layer authentication (e.g., 802.1x port authentication). An MiTM attack may occur when a rogue entity connects in between a supplicant and an authenticator with/without using the rogue device (e.g., Rogue Bridge).

Figure 4:
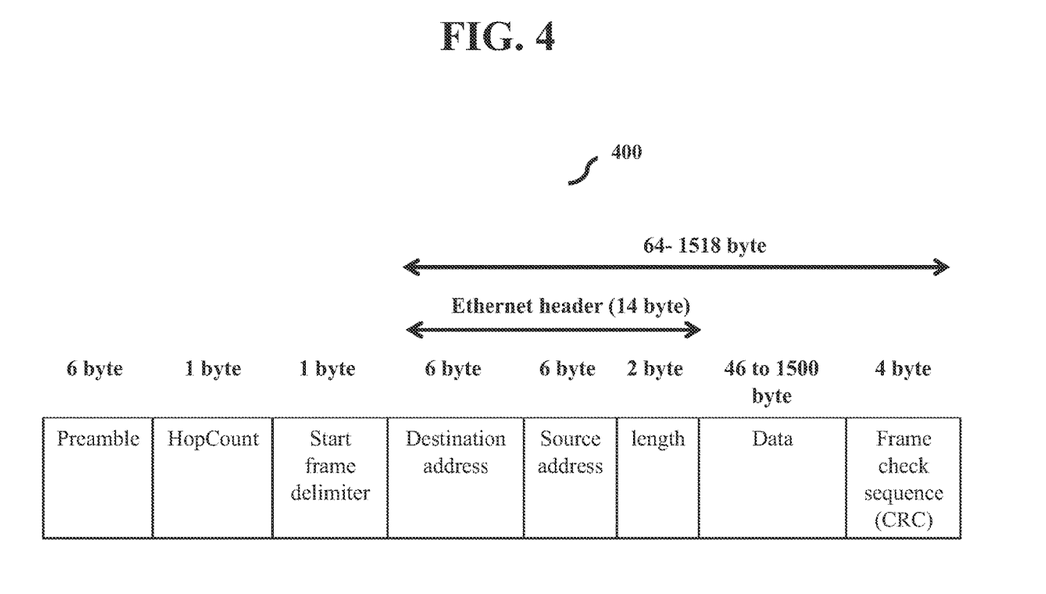
FIG. 4 illustrates an Ethernet header format with a hop count to prevent the MiTM attack, according to an embodiment as disclosed herein.
Figure 5:
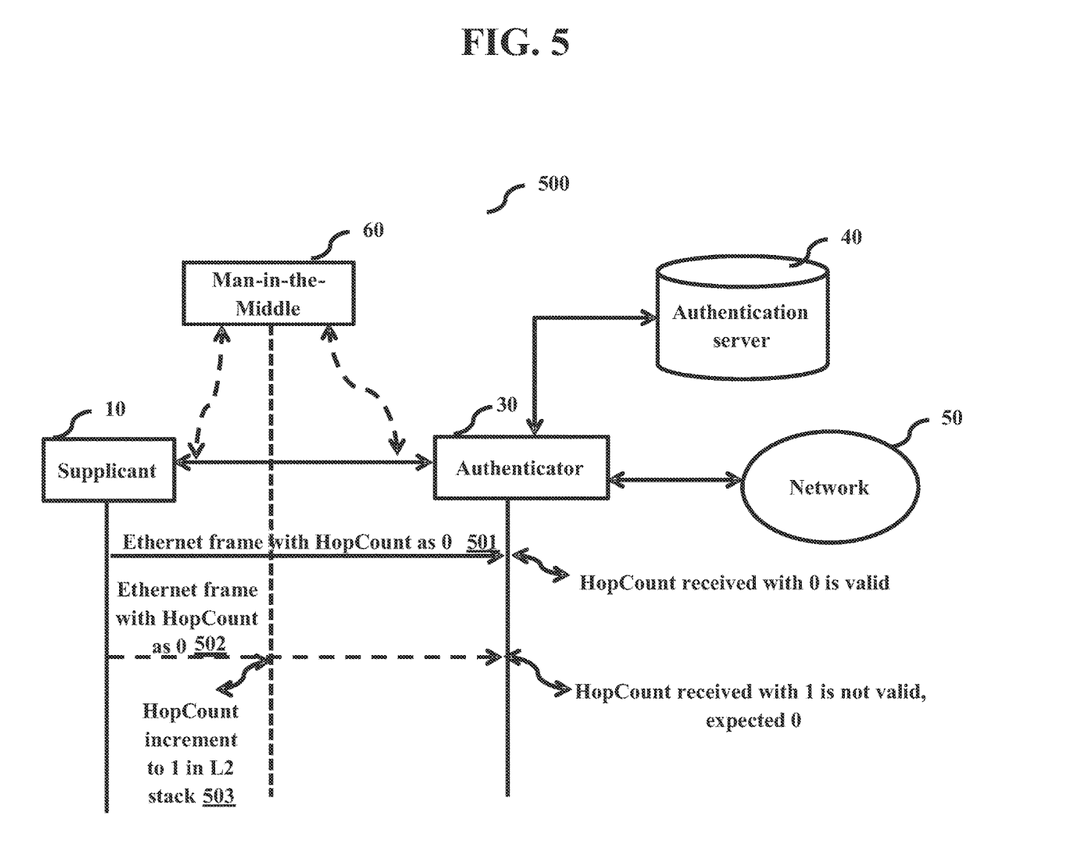
FIG. 5 illustrates an Ethernet frame flow using the hop count to prevent the MiTM attack, according to an embodiment as disclosed herein.

Referring now to the drawings, and more particularly to FIGS. 4 through 5, there are shown example embodiments of the present disclosure.

Figure 3:
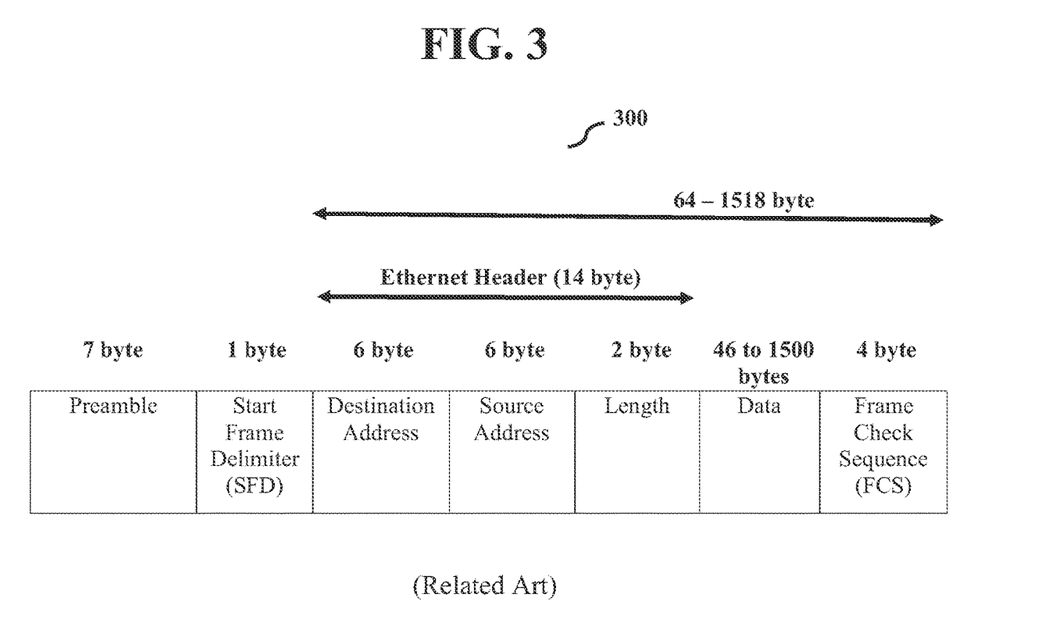
FIG. 3 illustrates an Ethernet header and frame according to the related art.

FIG. 4 illustrates an Ethernet header format (400) with a hop count used to prevent the MiTM attack, according to some embodiments. The Ethernet header format (400) includes a 6 byte preamble rather than the traditional 7 byte as shown in FIG. 3. The header format also includes a 1 byte Hop Count, a 1 byte Start Frame Delimiter (SFD), a 6 byte destination address, a 6 byte source address, a 2 byte length, a range of data (45 to 1500 byte), and a 4 byte Frame Check Sequence (CRC). That is, formatting the header to utilize a 6 byte preamble allows for the implementation of the 1 byte hop count. As a result, the hop count advantageously acts as a preventative measure to prevent an MiTM attack.

For example, during an authentication process, a supplicant (10) sends an authentication request to an authenticator (30) via an Ethernet frame(s). The hop count in the Ethernet frame(s) is used to detect an additional hop at an L2 layer when the Ethernet frame(s) is sent via a network (50) using a rogue entity (20) or a Man-in-the-Middle device (60). The rogue entity may include a rogue switch, a rogue bridge, etc. The Ethernet frame(s) is 64 bytes and the hop count will be of 1 byte length having values from 0 to 255. The hop count can be introduced and allocated from preamble 7 bytes consuming 1 byte i.e. 8 bits to a value range of 0-255. That is, the preamble may be shortened to 6 bytes and the 1 byte hop count is appended to the end of the preamble. The hop count may be provided after the preamble and before SFD as shown in the FIG. 4.

In some embodiments, the hop count may start with a value of 0 from the start of the Ethernet frame(s). Any switches/bridges/hubs that consume the Ethernet frame(s) and forward/broadcast the packet, may increment the hop count value. Any end entity/device, such as the authenticator (30), router, gateway or system that consumes the Ethernet frame(s) or changes the Ethernet frame(s) may check and compare the hop count in the Ethernet frame(s) to a minimum value. According to some embodiments, the minimum value may represent a predetermined threshold configured by network admin, security admin, etc. based on a topology of the network (50).

In some embodiments, when the hop count value in the frame is greater than the configured minimum predetermined threshold, the authenticator (30) may disable the port. A greater hop count value indicates that an MiTM entity might be present or that some external rogue entities were involved in transmitting data, which ultimately incremented the hop count. Therefore, the authenticator (30) disables the port as a precaution to prevent and distort any transmission path between the MiTM and the authenticator (30).

In addition, the trace route concept of checking how many hops are needed for routing IP packets can be used herein (e.g., the Ethernet hop count to check in regular intervals if any additional hops are introduced).

FIG. 5 is a diagram of an example environment 500 in which systems and/or methods, described herein, may be implemented. As shown in FIG. 5, environment 500 may include a supplicant (10), a MiTM (60), an authenticator (30), an authentication server (40) and a network (50). Devices of environment 500 may interconnect via wired connections, wireless connections, or a combination of wired and wireless connections. In some embodiments, any of the functions and operations described with reference to FIG. 6 below may be performed by any combination of elements illustrated in FIGS. 4-5.

Supplicant (10) may correspond to any terminal or device of the system end user requesting access to the network (50). Supplicant (10) may submit an authentication request via an Ethernet frame as shown in FIG. 4, for example. As such, the supplicant may provide credentials (e.g., credentials to be used for authentication) in the authentication request via the Ethernet frame (e.g., in the Data field of the Ethernet frame) or a subsequent frame. For example, the credentials may include a username and a password. Additionally, the authenticator (30) may correspond to and act as a control access point between the supplicant (10) and the authentication server (40).

The MiTM (60) device may correspond to any rogue entity attempting to collect, forward or transmit any information to and from the supplicant (10) and the authenticator (30).

The authentication server (40) may correspond to a backend server that executes port authentication. The authentication server (40) may include an information database corresponding to each of the credentials used by each supplicant 10 to connect to network (50). The authenticator (30) may transmit the supplicant (10) credentials to the authenticator server (40) for authentication. When the supplicant (10) credentials match the stored information, port authentication is deemed successful and the port is opened. However, when the supplicant (10) credentials do not match, port authentication fails and the port is disabled.

The network (50) may include one or more wired and/or wireless networks. For example, network (50) may include a cellular network (e.g., a fifth generation (5G) network, a long-term evolution (LTE) network, a third generation (3G) network, a code division multiple access (CDMA) network, etc.), a cloud network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

FIG. 5 illustrates an Ethernet frame flow 500 using the hop count to prevent the MiTM attack, according to an embodiment as disclosed herein.

The flow of the Ethernet frame(s) in case of a regular flow (501) is depicted in bold lines, and the case of the MiTM entity being present (502-503) is depicted in dotted lines. The authenticator (30) determines whether or not the MiTM exists between the supplicant (10) and the authenticator (30) based on the hop count. For example, the hop count between the supplicant (10) and the authenticator (30) must be zero or less than or equal to a predetermined threshold, signifying a valid authentication request. In that case, if the hop count is not zero or greater than the predetermined threshold (503), then the authenticator (30) detects that the MiTM exists between the supplicant (10) and the authenticator (30) and performs various counteractions. For example, the authenticator (30) may disable the port as a precautionary measure to prevent the MiTM attack. In some embodiments, the predetermined threshold may be a number greater than zero. According to some embodiments, if the hop count between the supplicant (10) and the authenticator (30) is less than a predetermined threshold, the authentication request is valid, and if the hop count is greater than or equal to the predetermined threshold, then the authenticator (30) detects a MiTM presence.

Figure 6:
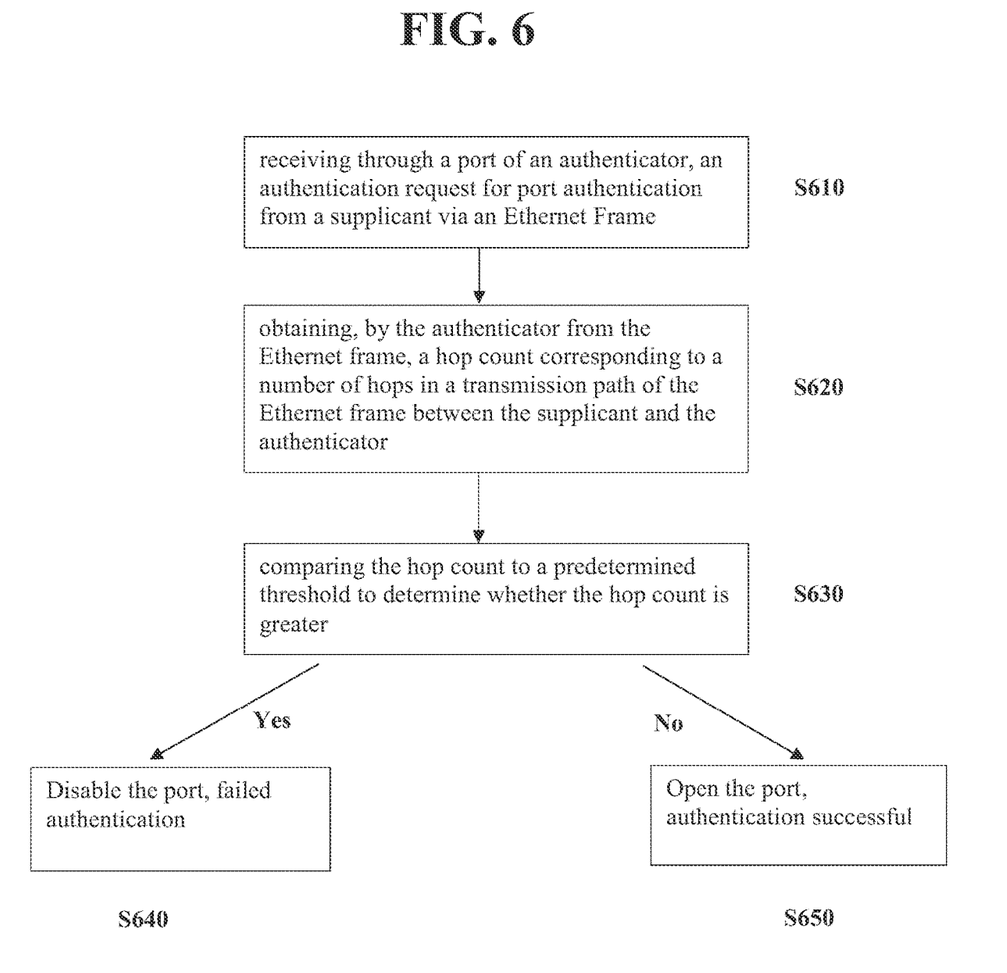
FIG. 6 is a flowchart of an example process for protecting a front-haul link from a Man-in-the-Middle (MiTM) attack, according to an example embodiment.

FIG. 6 is a flow chart of an example process for responding to a potential MiTM attack. The process illustrated in FIG. 6, may start at S610 where the authenticator (30) receives an authentication request from the supplicant (10) via an Ethernet frame through a port of the authenticator (30). The process may proceed to step S620, where the authenticator (30) then obtains from the Ethernet frame a hop count corresponding to the number of hops in the transmission path between the supplicant (10) and the authenticator (30). If the Ethernet frame was hopped (e.g., received and forwarded) via any device or entity within the transmission path between the supplicant (10) and authenticator (30), the hop count in the Ethernet frame will be incremented.

The process proceeds to step S630, where the authenticator (30) compares the hop count to a predetermined threshold to determine whether the hop count is greater than the predetermined threshold. The predetermined threshold represents the allowable value of hops. The threshold may be configured by a network admin, security admin, etc., based on a topology of the network (50). When the hop count is greater than the predetermined threshold (Yes), then the port is disabled as the authentication request is determined as invalid and the authentication failed, as shown in S640. When the hop count is not deemed greater than the predetermined threshold (No) and the port authentication is performed successfully, the port is opened, as shown in step S650.

In other embodiments, the effects of introducing the hop count will cause the Ethernet frame(s) change impact to be considered in all L2 entities. A trace route may also be incorporated to bring in additional frames in regular intervals for checking any change in the hop count.

In other embodiments, additional configurations of the predetermined threshold may be limited to be in L2 links similar to Maximum Transmission Unit (MTU), Medium Access Control (MAC) address, etc., configurations. A default of 0/255 may be used for the hop count.

In other embodiments, the MiTM (60) may observe the Ethernet frame(s) from the supplicant (10) and alter or reset the hop count value.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method, performed by at least one processor, for protecting a front-haul link from a Man-in-the-Middle (MiTM) attack, in a network communication system, the method comprising:
    receiving, through a port of an authenticator, an authentication request for port authentication from a supplicant via an Ethernet Frame;
    obtaining, by the authenticator from the Ethernet frame, a hop count corresponding to a number of hops in a transmission path of the Ethernet frame between the supplicant and the authenticator;
    comparing the hop count to a predetermined threshold to determine whether the port should be disabled; and
    disabling the port based on the hop count being greater than the predetermined threshold.

2. The method as claimed in claim 1, wherein the predetermined threshold is configured in the port of the authenticator, the port being an L2 interface.

3. The method as claimed in claim 1, wherein the hop count is obtained from a header of the Ethernet frame.

4. The method as claimed in claim 3, wherein the header of the Ethernet frame comprises a 6 byte preamble and a 1 byte hop count field in which the hop count is recorded.

5. The method as claimed in claim 4, wherein the hop count field is between the preamble and a Start Frame Delimiter (SFD) field.

6. The method as claimed in claim 1, wherein the hop count is incremented in the Ethernet frame by any device included in the transmission path.

7. The method as claimed in claim 1, wherein the port authentication is an IEEE 802.1x port authentication.

8. An apparatus for protecting a front-haul link from a Man-in-the-Middle (MiTM) attack, in a network communication system, the apparatus comprising:
  a memory storing instructions; and
  at least one processor configured to execute the instructions to:
  receive, through a port of an authenticator, an authentication request for port authentication from a supplicant via an Ethernet Frame;
  obtain, by the authenticator from the Ethernet frame, a hop count corresponding to a number of hops in a transmission path of the Ethernet frame between the supplicant and the authenticator;
  compare the hop count to a predetermined threshold to determine whether the port should be disabled; and
  disable the port based on the hop count being greater than the predetermined threshold.

9. The apparatus as claimed in claim 8, wherein the predetermined threshold is configured in the port of the authenticator, the port being an L2 interface.

10. The apparatus as claimed in claim 8, wherein the hop count is obtained from a header of the Ethernet frame.

11. The apparatus as claimed in claim 10, wherein the header of the Ethernet frame comprises a 6 byte preamble and a 1 byte hop count field in which the hop count is recorded.

12. The apparatus as claimed in claim 11, wherein the hop count field is between the preamble and a Start Frame Delimiter (SFD) field.

13. The apparatus as claimed in claim 8, wherein the hop count is incremented in the Ethernet frame by any device included in the transmission path.

14. The apparatus as claimed in claim 8, wherein the port authentication is an IEEE 802.1x port authentication.

15. A non-transitory computer-readable recording medium having record thereon instructions executable by at least one processor to perform a method for protecting a front-haul link from a Man-in-the-Middle (MiTM) attack, in a network communication system, the method comprising:
  receiving, through a port of an authenticator, an authentication request for port authentication from a supplicant via an Ethernet Frame;
  obtaining, by the authenticator from the Ethernet frame, a hop count corresponding to a number of hops in a transmission path of the Ethernet frame between the supplicant and the authenticator;
  comparing the hop count to a predetermined threshold to determine whether the port should be disabled; and
  disabling the port based on the hop count being greater than the predetermined threshold.

16. The non-transitory computer-readable recording medium according to claim 15, wherein the predetermined threshold is configured in the port of the authenticator, the port being an L2 interface.

17. The non-transitory computer-readable recording medium according to claim 15, wherein the hop count is obtained from a header of the Ethernet frame.

18. The non-transitory computer-readable recording medium according to claim 17, wherein the header of the Ethernet frame comprises a 6 byte preamble and a 1 byte hop count field in which the hop count is recorded, and
  wherein the hop count field is between the preamble and a Start Frame Delimiter (SFD) field.

19. The non-transitory computer-readable recording medium according to claim 15, wherein the hop count is incremented in the Ethernet frame by any device included in the transmission path.

20. The non-transitory computer-readable recording medium according to claim 15, wherein the port authentication is an IEEE 802.1x port authentication.

* * * * *